United States Patent [19]

Bluteau

[11] Patent Number: 5,321,931
[45] Date of Patent: Jun. 21, 1994

[54] METHOD AND APPARATUS FOR STORING USED TIRES

[76] Inventor: Yves J. Bluteau, 429, Grande-Cote, Rosemére, Quebec, Canada, J7A 1L2

[21] Appl. No.: 733,621

[22] Filed: Jul. 22, 1991

[30] Foreign Application Priority Data

Jul. 23, 1990 [GB] United Kingdom ............... 9016089

[51] Int. Cl.$^5$ .................... B26D 1/24; B65B 25/24
[52] U.S. Cl. ................... 53/435; 53/436; 53/447; 53/513; 53/528; 53/581; 83/951; 100/39; 100/94
[58] Field of Search ............... 53/435, 436, 513, 528, 53/526, 581, 204, 447, 443; 100/94, 39; 83/951

[56] References Cited

U.S. PATENT DOCUMENTS

| | | | |
|---|---|---|---|
| 2,875,909 | 3/1959 | Babick et al. | 53/581 X |
| 2,921,423 | 1/1960 | Cover et al. | 53/204 X |
| 4,694,716 | 9/1987 | Sakamoto | 83/951 X |
| 4,976,178 | 12/1990 | Barclay | 83/951 X |

Primary Examiner—James F. Coan
Attorney, Agent, or Firm—Roland L. Morneau

[57] ABSTRACT

A method and apparatus for storing a plurality of tires having a threaded portion, a rim portion and two sidewall portions, said method comprising the following steps; peripherally slicing each of said tires in two half tires along said threaded portion about midway between said sidewall portions; performing radial incisions in each of said two half tires, said incisions extending through said threaded portion and part of said sidewall portion; stacking up said half tires one on top of the other in order to form a pile of half tires; compressing said pile longitudinally in order to flatten said half tires one over the other; whereby, said radial incisions allow the threaded portion of each half tire to lie in the same plane as the sidewalls of the same half tire without warping when said half tire is compressed into a flattened condition.

21 Claims, 14 Drawing Sheets

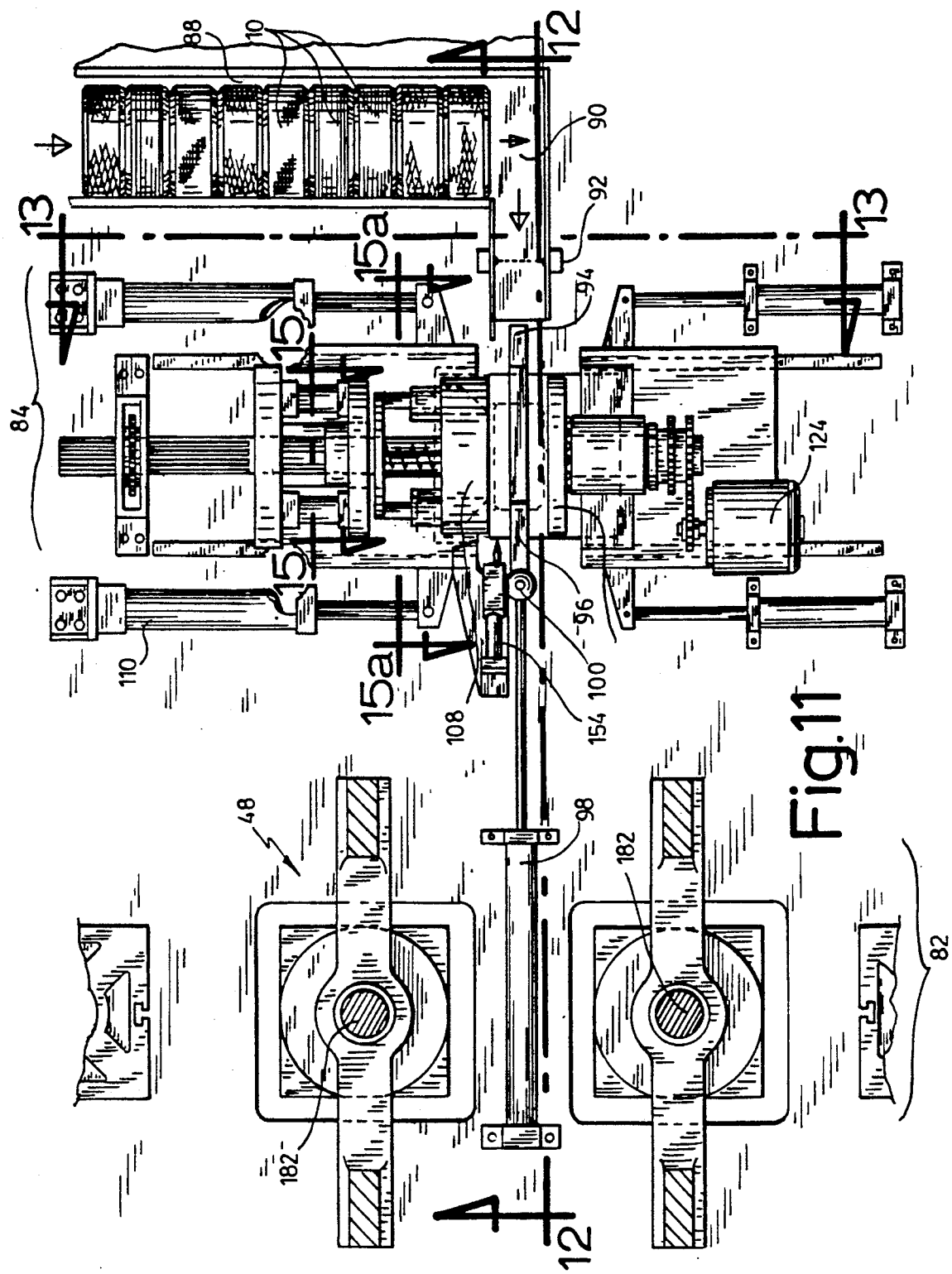

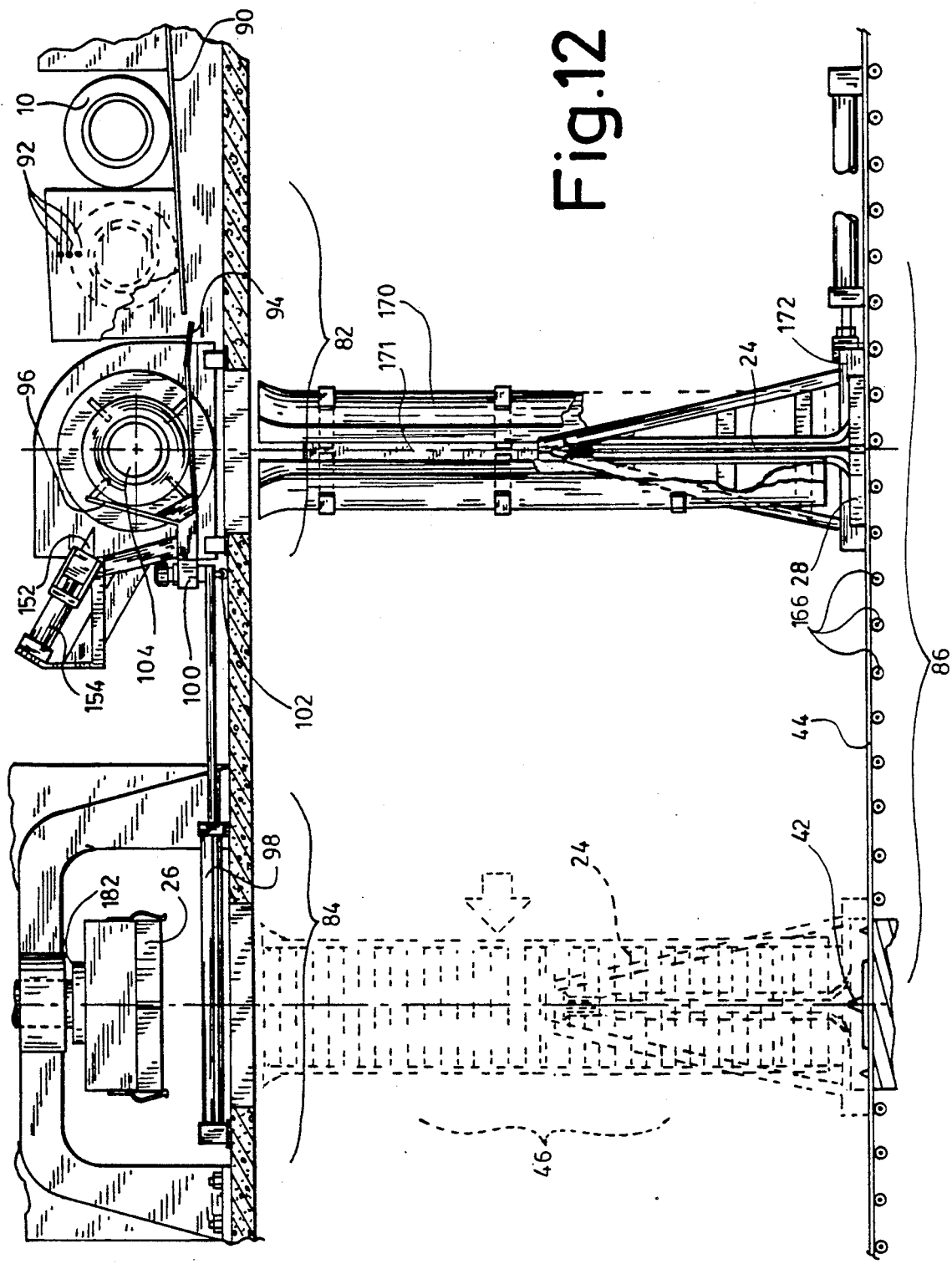

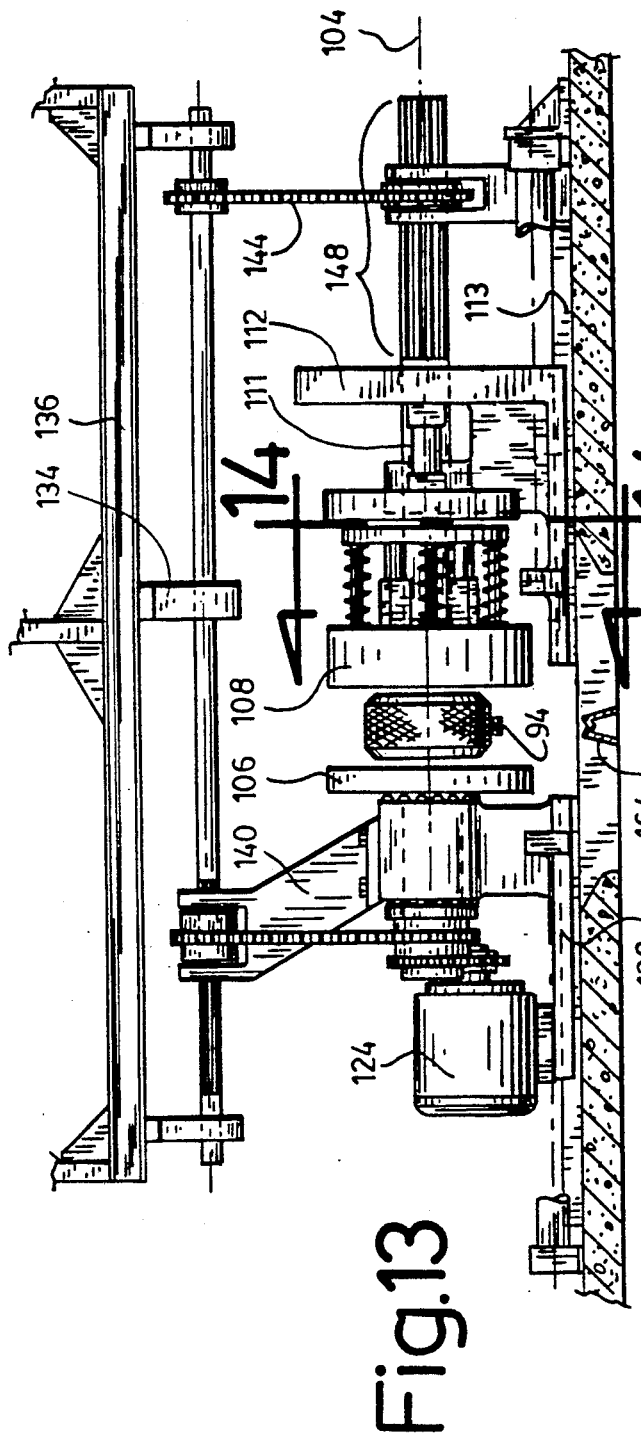
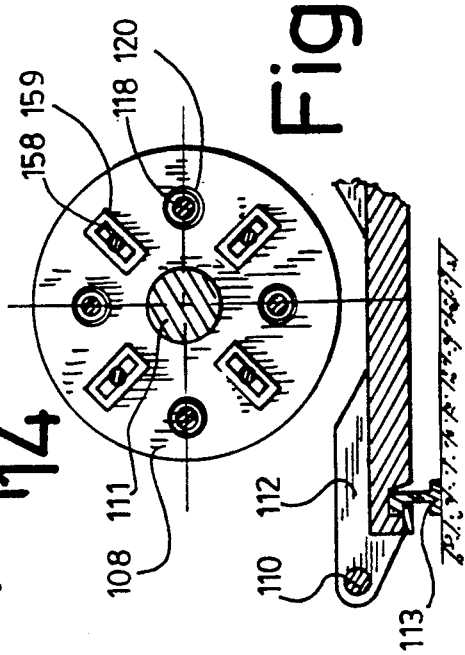
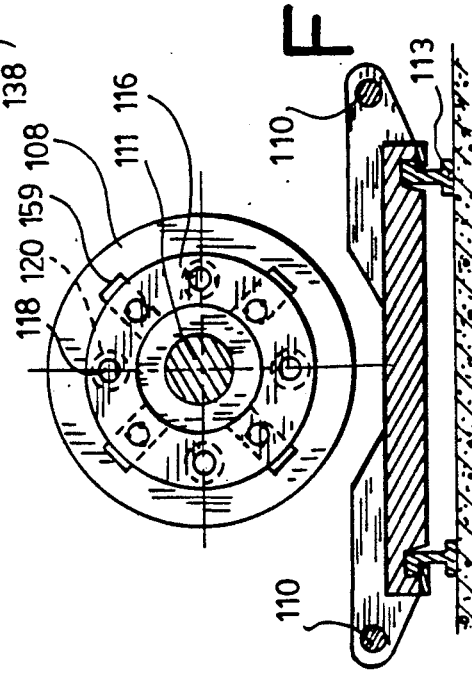

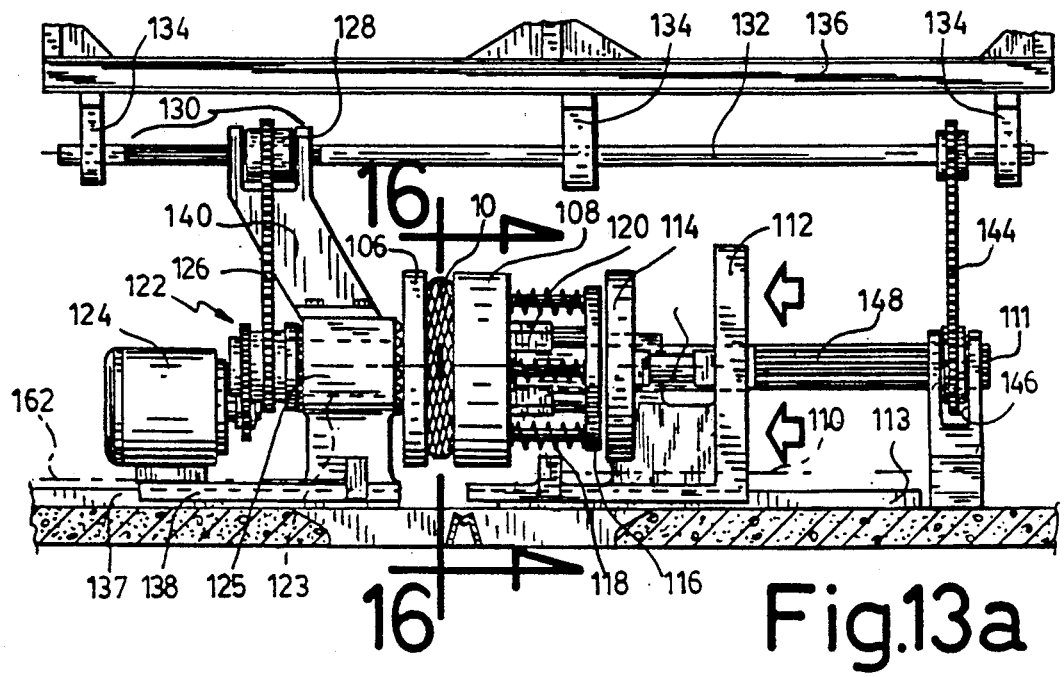
Fig.13a
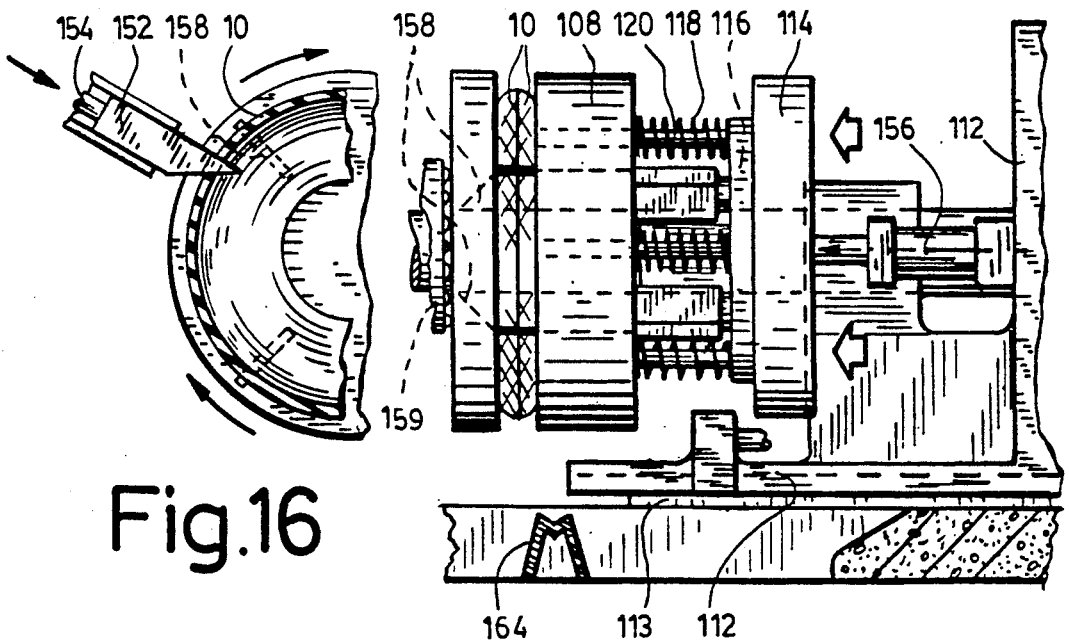
Fig.16
Fig.13b

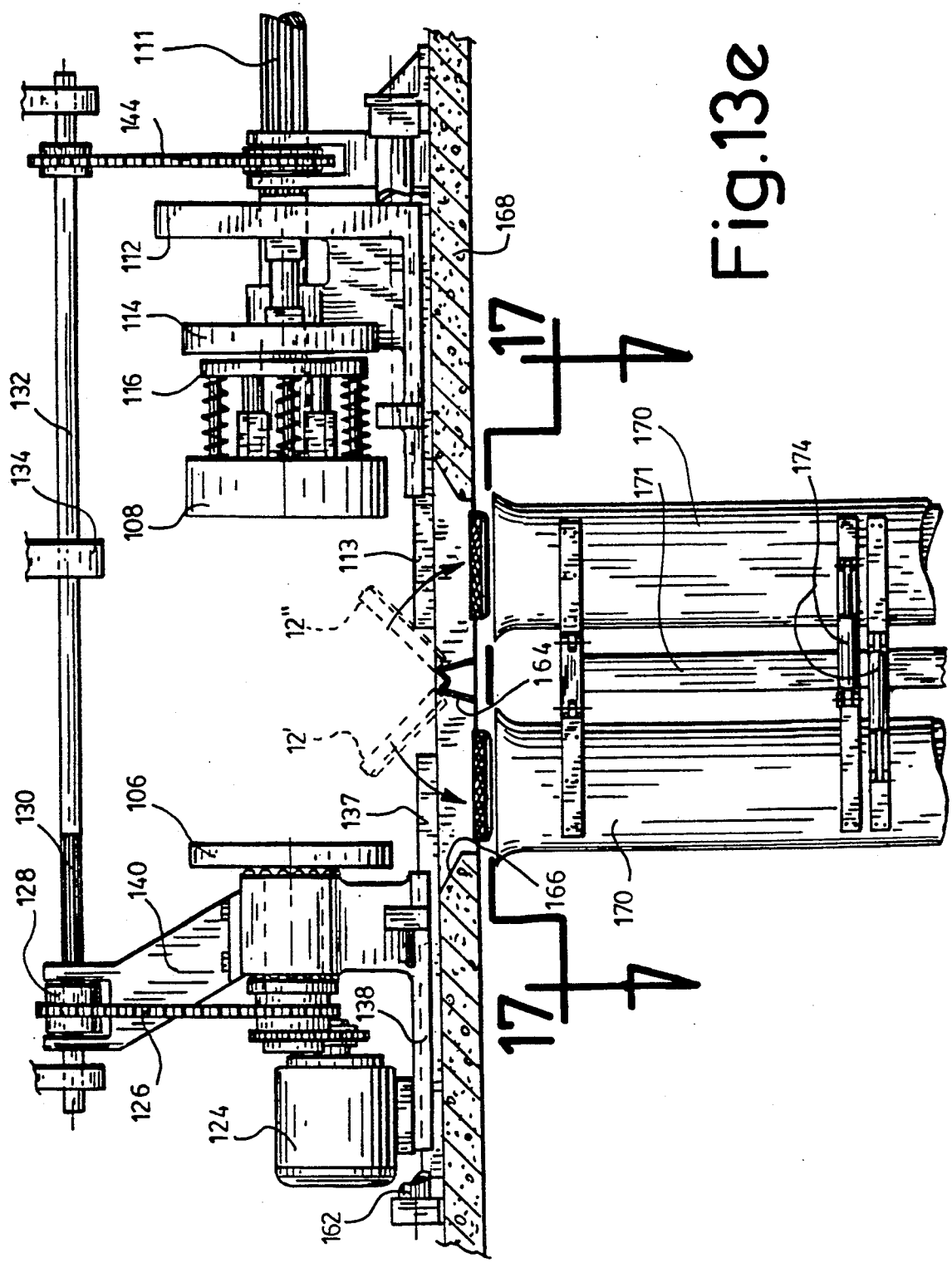

METHOD AND APPARATUS FOR STORING USED TIRES

BACKGROUND OF THE INVENTION

1. Field of the Invention

The present invention relates to the field of used tires storage and more specifically to a method and apparatus for taking used tires and slicing them into rings which are then stacked one on top of the other and compressed. The used tires are thus stored in a compressed flattened condition occupying a minimal amount of space.

2. Prior Art

Used tires represent a major problem in most industrialized countries. Various attempts have been made to burn or recycle used tires but the cost of such operations is so high that the majority of used tires are simply stacked in random piles or buried.

As a result, some areas have huge piles of used tires occupying valuable space and representing a potential hazard for fires which could cause environmental disasters.

To minimize the space occupied by the used tires, the present invention provides a method and an apparatus adapted to slice the tires into rings which are vertically stacked and compressed into flattened discs.

The piles of compressed stacked tires are held together by top and bottom retaining components which allow the tires to be stored in a compressed condition. A plurality of piles can be juxtaposed in order to form structures which can be used as blocks.

A search amongst prior patents revealed an apparatus described in U.S. Pat. No. 3,265,224 for stabilizing vertical stacks of tires on a pallet. However, the tires were not previously sliced into rings and thus still occupy a large amount of space.

U.S. Pat. Nos. 3,545,632, 3,922,942, 4,338,840, 4,338,339 and 4,134,316, all disclosed tire cutting apparatus adapted to cut the used tires according to various patterns. However, only 4,134,316 granted to Billinger discloses an apparatus adapted to cut the tires into annular configurations. Billinger's patent discloses an apparatus for severing tire carcasses through the thread portion in order to reduce the carcasses to a plurality of annular rings. However, the rings are not cut radially and thus are not adapted to be compressed in a flattened configuration.

SUMMARY OF THE INVENTION

The present invention thus relates to a method and apparatus for storing a plurality of tires having a threaded portion, a rim portion, and two side wall portions. The method comprises the following steps; first, peripherally slicing each of the tires into two half tires along the threaded portion about midway between the side wall portions, then performing radial incisions in each half tire, the incisions extending through the threaded portion of the side wall portions, then stacking up the half tires one on top of the other in order to form a pile of half tires and compressing the piles longitudinally in order to 7 flatten the half tires one over the other.

The radial incisions allow the threaded portion of each half tire to lie in the same plane as the side walls of the same half tire without warping when the half tires are compressed into a flattened condition.

In the previously described method, the side walls of the half tire are preferably stacked with their side walls facing in the same direction. The incisions preferably extend to about the middle of the side walls.

The peripherally and radially cut half tires are adapted to form a device which can be used as structural building material. The device comprises a central shaft for coaxially stacking up the hal f tires, a base secured to the shaft for supporting the half tires, a perforated plate adapted to axially slide down on the shaft over a plurality of half tires and adapted to be mounted on the shaft for compressing the half tires, and means for locking the perforated plate to the shaft.

In one embodiment, the perforated plate comprises releasably self-locking teeth which are centrally directed towards the shaft. The perforated plate is adapted to compress a pile of half tires of a predetermined height. The base comprises an annular groove around the shaft for centering the lowermost half tire.

The annular space defined between the shaft and the rim of the stacked half tires is adapted to be filled with concrete when the device is used as a structural component.

The invention not only relates to a method but also to an apparatus adapted to perform a cutting cycle for slicing a tire having a threaded portion, two side wall portions and a rim portion in two half along the threaded portion and performing a plurality of radial incisions extending through the threaded portion.

The apparatus comprises a base frame, a first plate and a second plate positioned on each side of the tire, a means for pushing the first plate against the tire, thus partially pressing the tire between the first plate and the second plate and bringing the tire to a partially flattened condition, a means for rotating the second plate, a means for bringing a peripheral knife in contact with the threaded portion of the tire when the tire is rotated and in a partially flattened condition, a means for pushing a set of radial knives through a set of channels provided in the first plate and through both sides of said tire when the tire is in the flattened condition in order to perform the radial incisions, recess means in the second plate for receiving the radial knives once they have cut through both sides of the tire, means for rotating the second plate in synchronization with the rotation of the first plate so that the recess means are always in register with the radial, knives, means to retract the radial knives from the tire and means to move the first plate away from the second plate to allow the two half tires, once they are cut, to relax in an uncompressed condition and to allow the half tires to be removed from the apparatus.

During the cutting cycle of the apparatus, the first plate first flattens the tire against the second plate before the first plate and the second plate are put in synchronized rotation. The peripheral knife is then put into contact with the threaded portion of the tire which is still in a flattened condition. The tire is thus sliced into two half tires. The peripheral knife is then retracted and the rotation of the first and second plate is stopped. The radial knives are then pushed through the channels in the first plate and through the tire which is still in the flattened condition until the radial knife extends through both sides of the tire thus producing the radial incisions. Once the radial knives have produced the radial incisions, they extend into a set of recess means provided in the second plate. The radial knives are then retracted from the tire and the first plate is moved away from the second plate to allow the tire now cut into two radially incised half tires to relax into an uncompressed condition and to be removed from the apparatus.

The means for rotating the second plate comprises a shaft rigidly linked to the second plate at one end and releasably connected to a rotational motor at its other end by a clutch means. The second plate is thus selectively put into rotation by actuation of the clutch means.

The means for bringing the peripheral knife in contact with the threaded portion of the tire comprises a piston rigidly attached to the frame at one of its ends and to peripheral knife at its other end. The piston is positioned between the first plate and the second plate, adjacent the periphery of the tire when the tire is in its partially flattened condition. The piston is adapted to bring the peripheral knife in contact with the threaded portion of the tire, when the tire is in a flattened condition and rotating, and is also adapted to retract the peripheral knife from the tire when the tire is sliced into the two half tires.

The means for pushing the first plate against the tire comprises a translating structural component adapted to translate on the base frame, a first plate shaft rigidly connected to the first plate at one of its ends and rotatably mounted to the translating structural component at its other end, a piston rigidly linked to the base frame at one of its ends and to the translating structural component at its other end. The piston is adapted to push the translating structural component which is linked to the first plate by the first plate shaft, thus pushing the first plate against the tire while allowing a rotation of both the first plate and the first plate shaft.

The means for pushing the set of radial knives through the channels provided in the first plate and through both sides of the tire comprises at least one secondary piston attached at one of its ends to the translating structural component and at its other end to a second facing plate. The radial knives are attached at one of their ends to a first facing plate. The secondary piston is adapted to push the second facing plate against the first facing plate to which the radial knives are attached thus driving the radial knife through the set of channels in the first plate and through both sides of the tire.

The facing plate is linked to the first plate by a set of guiding rods connected at one of their ends to the first facing plate and adapted to slide inside a set of corresponding apertures provided in the first plate. The means for retracting the radial knives from both sides of the tire comprise a set of springs abutting at one of their ends against the first plate and at their other end against the first facing plate. The springs are mounted on the guiding rods. When the secondary piston pushes the secondary facing plate against the first facing plate thus driving the radial knife through both sides of the tire, the springs are compressed between the first plate and the first facing plate and when the secondary piston retracts the secondary facing plate from the first plate, the springs resiliently separate the first facing plate from the first plate thus retracting the radial knives from the tire.

In one particular embodiment of the invention, the means for rotating the second plate in synchronization with the rotation of the first plate so that the recess means are always in register with the radial knives comprises a first set of teeth mounted on the periphery of the second plate, a first gear adapted to engage the first set of teeth, a shaft axially linking the first gear with the second gear, a second set of teeth mounted on the periphery of the first plate and adapted to engage with the second gear. The second gear has axially long teeth. When the second plate is put into rotation, the first set of teeth rotates the first gear, the shaft transmits the rotation to the second gear which rotates in turn the second set of teeth on the periphery of the first blade. The axially long teeth allow the first plate to translate while maintaining a contact between the second set of teeth and the second gear.

In another embodiment of the invention, the first plate shaft has a splined section and the means for rotating the second plate in synchronization with the rotation of the first plate so that the recess means are always in register with the radial knife comprises a synchronization shaft having a synchronization spline section, the shaft being rotatably suspended through a set of sleeves, the sleeves being attached to a structural element positioned over the apparatus. A slidable gear is slidably mounted on the synchronization splined section of the synchronization shaft. A first forked arm is fixed at one end to the rotational motor and has a first arm forked section at its other end adapted to abut against both sides of the slidable gear. A first fixed gear is mounted on the synchronization shaft while a second fixed gear is mounted on the spline section of the first plate shaft. A first chain rotatably links the slidable gear to the second plate shaft while a second chain rotatably links the first fixed gear to the second fixed gear. A second forked arm is fixed at one of its ends to the base frame and has a second arm forked section abutting against both sides of the second fixed gear. Upon actuation of the rotational motor, the second plate shaft rotates the first chain which rotates the slidable gear. The slidable gear rotating with the synchronization shaft on which the first fixed gear is mounted thus rotates the first fixed gear to which the second chain is attached. The second chain rotates in turn the second fixed gear mounted on the splined section of the first plate shaft. The rotational motor is thus adapted to rotate both the second plate shaft and the first plate shaft in synchronization.

In one embodiment of the invention, the tires are automatically fed into the cutting apparatus. The tires are fed into the apparatus by rolling down a loading chute onto a supporting structure composed of a substantially horizontal supporting arm rigidly linked to a substantially vertical supporting arm. The tires pass in front of a set of photoelectric cells while rolling down the inclined chute. The photoelectric cells are adapted to detect the diameter of each individual tire. The photoelectric cells then send a signal to a pneumatic control box which is adapted to interpret the reading of the photoelectric cells and send the command to an horizontal sized adjustment piston and a vertical adjustment piston and a vertical adjustment sized piston. The horizontal and vertical adjustment pistons are adapted to move the horizontal supporting arms and the vertical supporting arms in order to center the tire in line with a central longitudinal axis of the first plate shaft.

In one embodiment of the invention, the tires are automatically retracted from the slicing apparatus. In this embodiment, when the first plate is moved away from the second plate, the tires fall onto a substantially M-shaped splitting element which splits the already sliced tire into two halves and directs the fall of each half tire so that each half tire falls with its threaded portion curving upwardly through an aperture provided in the floor adjacent the first and second plate onto a pair of corresponding base plates and central post strategically positioned underneath the first and second plate.

In one embodiment of the invention, once the half tires have stacked up on the base plates, the base plates are moved towards the compacting unit by conveyer belts. In this embodiment, a set of articulated half cylinders are adapted to accompany the stacks of uncompressed tires to the compressing unit. The articulated cylinders are adapted to prevent the portion of the stack exceeding the central post from tilting during the transportation of the tires to the compacting unit.

DESCRIPTION OF THE DRAWINGS

FIG. 11 is a top view of an apparatus adapted to automatically transform a stack of tires into flattened tires FIG. 12 is an elevational cross-sectional view of the apparatus taken along arrows 12 of FIG. 11;

FIG. 13 is a side cross-sectional view of a cutting unit part of the apparatus illustrated in FIG. 11 taken along arrows 13 of FIG. 11;

FIG. 13a is a view of a tire being partially compressed in the cutting apparatus;

FIG. 13b is a view of the tire being sliced in the cutting apparatus;

FIGS. 13d and 13e are views of the tire being split in half;

FIG. 14 is a cross-sectional view of the cutting apparatus taken along arrows 14 of FIG. 15;

FIG. 15a is a cross-sectional view taken along arrows 15a of FIG. 11;

FIG. 16 is a cross-sectional view taken along arrows 16 of FIG. 13a;

DETAILED DESCRIPTION OF THE PREFERRED EMBODIMENT

Figure 1:
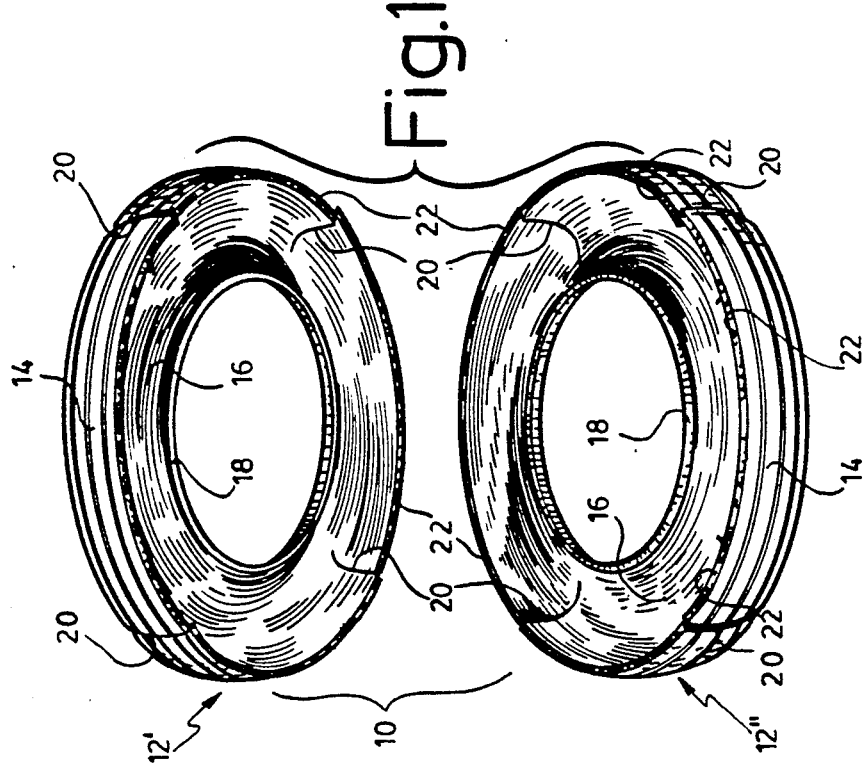
FIG. 1 is a schematic perspective view of a tire which has been sliced in half and which has been radially incised according to the method of the present invention.
Figure 3:
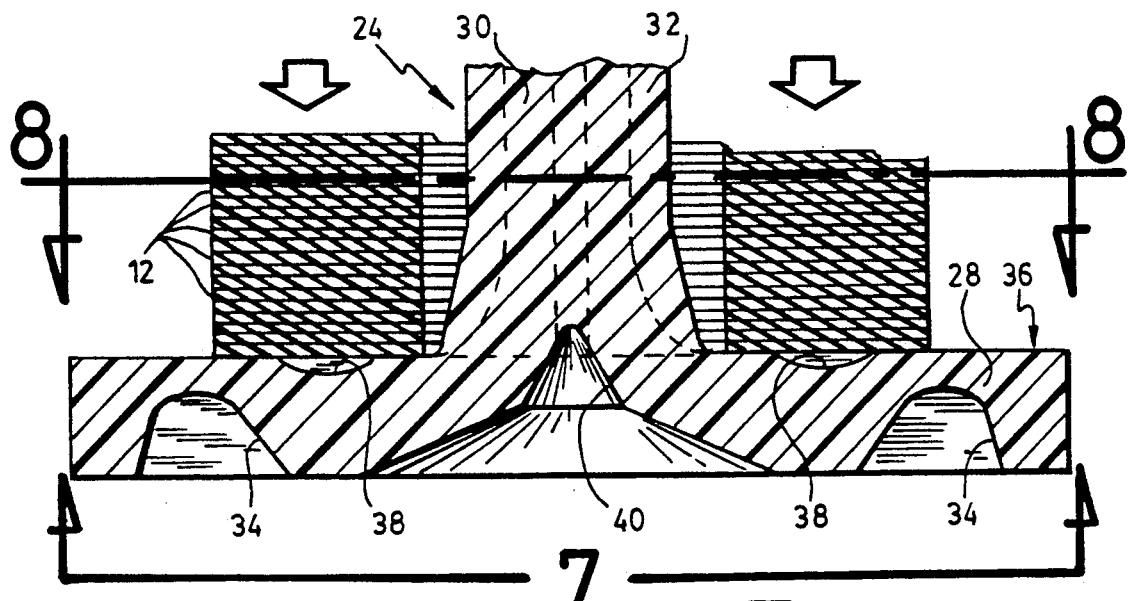
FIG. 3 is a cross-sectional view of the base plate of the stacking structure taken along arrows 3—3 of FIG. 2.

Referring to FIG. 1, there is shown a tire 10 sliced in two halves 12' and 12", each half having a threaded portion 14, a side wall portion 16 and a rim 18. The tire 10 is peripherally sliced along its threaded portion 14 approximately midway between the two side walls 16 in order to define two halves 12' and 12" of substantially equal size.

Figure 2:
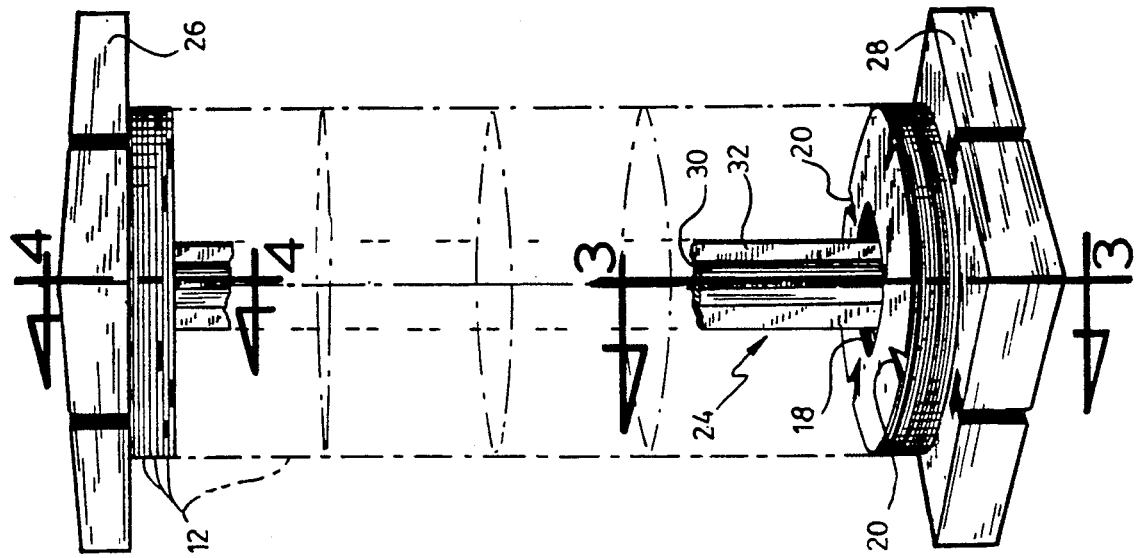
FIG. 2 is a schematic perspective view of a pile of half tires held in a compressed relationship by a stacking structure.

Each half 12' and 12" also has four radial incisions 20 extending from a marginal edge 22 through the threaded portion 14 and a portion of the side wall portion 16. The radial incisions 20 allow the threaded portions 14 to be flattened in the same plane as the side walls portions 16 without warping. As illustrated in FIG. 2, once the half tires 12 are flattened, the radial incisions 20 substantially assume the form of V-shaped cut outs extending from the periphery of the flattened discs and pointing inwardly.

One of the main objectives of the present invent ion is to minimize the space occupied by the used tires. By flattening the tires and stacking them in piles of flattened tires, it is estimated that the volume occupied by the tires is reduced by approximately 90%.

Furthermore, once the tires are stacked in organized piles, they become easier to handle.

In one embodiment of the invention, the tires are stacked on a central post which extends through the central annular aperture defined by the rim 18 of each half tire 12. The post tensionally links a top retaining plate to a bottom plate, keeping the half tires in a flattened compressed condition.

The following description of a stacking structure refers to an embodiment, illustrated in FIGS. 2 to 10, specifically suited for mass processing by an automatic machine described later in this patent.

In this specific embodiment, a central post 24 is formed integrally with a bottom plate 28. The central post 24 has a main cylindrical section 30 formed integrally with a set of reinforcing ribs 32.

To minimize the weight and the cost of material, the base plate 28 is provided with a set of hollowed-out sections 34. The top surface 36 of the base plate 28 is provided with an hollowed out annular centering channel 38. The centering channel 38 will help in centering around the post 24 the first half tire coming into contact with the base plate 28 during the piling operation. Since tile uncompressed half tires are concave, the first half tire coming into contact with the base plate 28 will sit in the channel 38.

The base plate 28 is also provided with a substantially conically shaped hollowed out registering section 40. The registering section 40 will allow the base plate 28 to be in register with a corresponding pin 42 provided in a conveyer belt 44 illustrated in FIG. 12 and described later in this patent.

During the stacking operation which will also be described in detail later in this patent, the substantially concave uncompressed half tires 12 are stacked one on top of the other into a vertical pile referred to by numeral 46 in FIG. 12. A mechanical press 48 which releasably supports the top plate 26, then presses downwardly on the pile 46 flattening the half tires 12 until the pile reaches the height of the central post 24. In order to minimize the size of the drawing, FIG. 12 shows the uncompressed pile approximately twice as high as the central post 24. Typically, the uncompressed pile 46 is approximately four times higher than the central post 24.

Once the top plate 26 reaches the level of the top of the central post 24, it is adapted to self-lock onto the central post 26, thus keeping the half tires in a flattened compressed condition.

Figure 4:
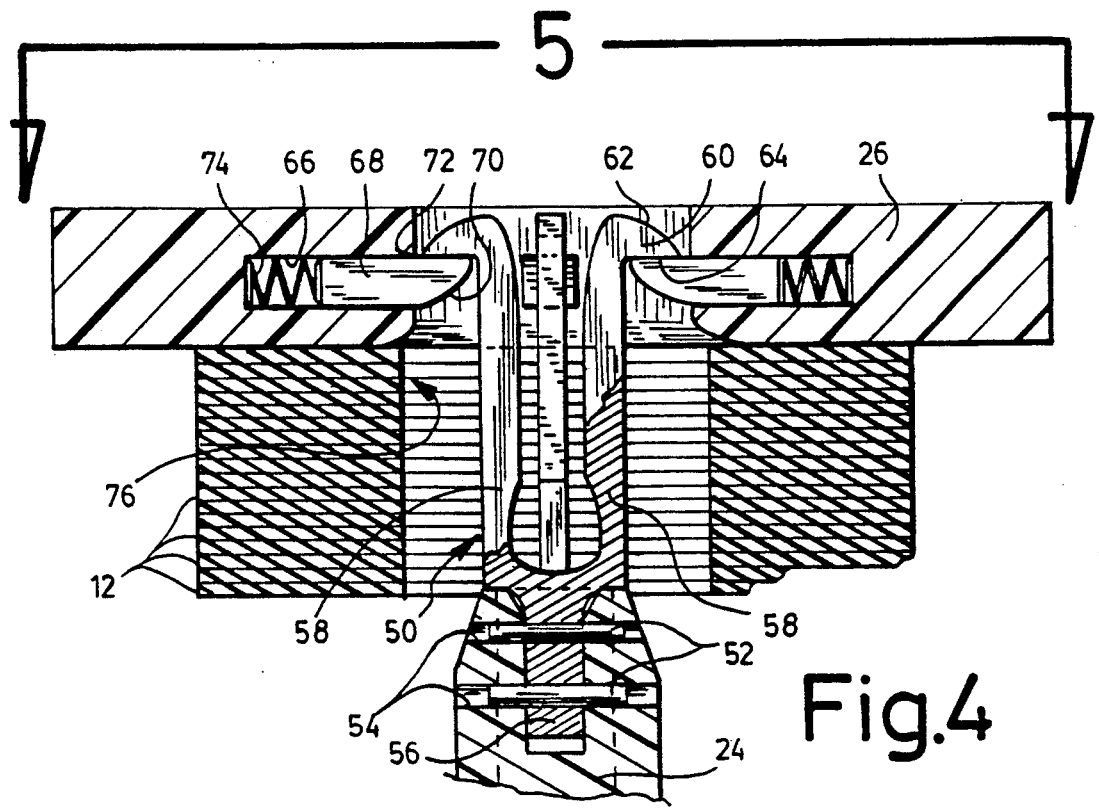
FIG. 4 is a cross-sectional view taken along arrows 4—4 of FIG. 2.
Figure 5:
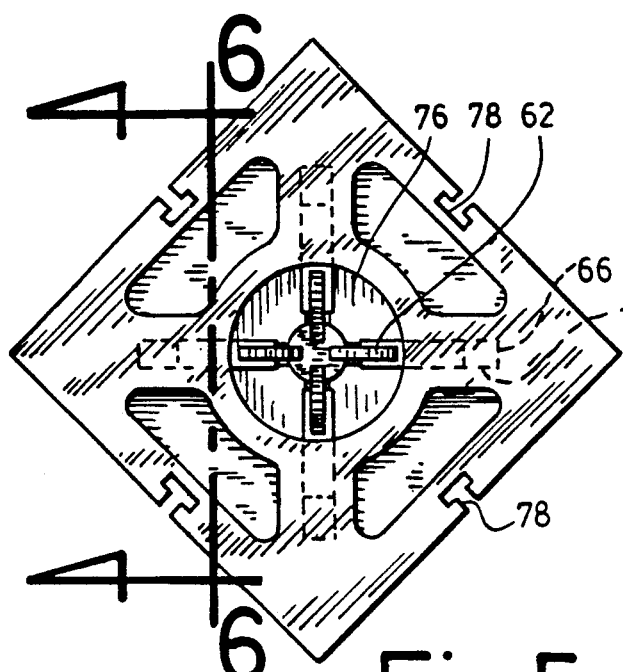
FIG. 5 is a top view of the top plate taken along arrows 5—5 of FIG. 4.
Figure 6:
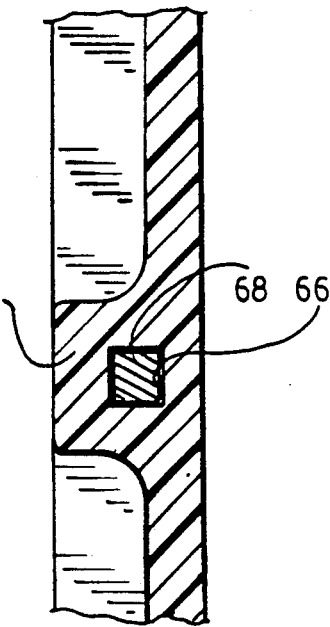
FIG. 6 a cross-sectional view taken along arrows 6—6 of FIG. 5.
Figure 7:
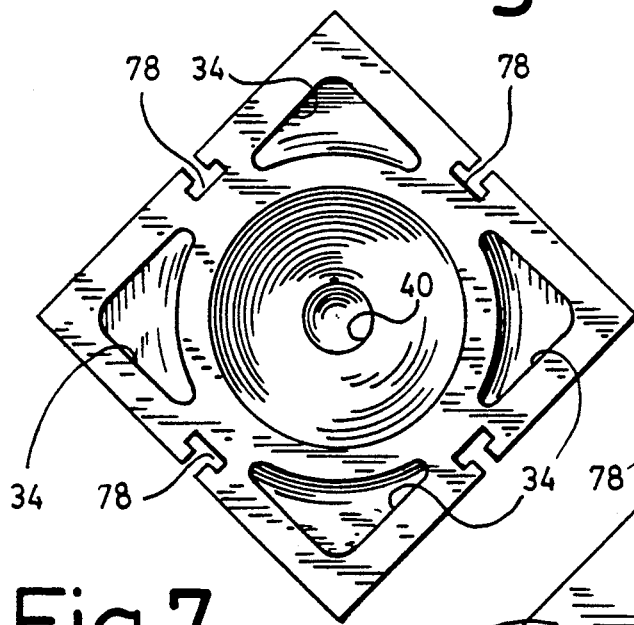
FIG. 7 is a bottom view of the bottom plate taken along arrows 7—7 of FIG. 3.

The self locking mechanism adapted to releasably lock the top plate 26 to the central post 24 is illustrated more specifically in FIGS. 4, 5 and 6. A gripping structure 50 is rigidly fixed to the top portion of the post 24 by a retaining means such as a pair of locking pins 52 which extend through a corresponding pair of channels 54 provided in both the post 24 and a stem portion 56 of the gripping structure 50. A set of four gripping arms 58 extend integrally and upwardly from the stem portion 56. The arms 58 extend integrally at their upper extremity into substantially perpendicular sections 60 having an arcuate top surface 62 and a flat bottom surface 64.

The top plate 26 is provided with four radial hollowed out channels 66 adapted to slidably receive a set of four corresponding gripping teeth 68.

The teeth 68 have a substantially arcuate bottom surface 70 and a substantially flat top surface 72. The teeth 68 are resiliently biased outwardly by the set of springs 74 located in the channels 66.

When the top plate 26 is pressed downwardly on the gripping structure 50, the arcuate top surface 64 of the arms 58 comes into contact with the arcuate segment 70 of the teeth 68, pushing the latter inwardly inside the channels 66 until they clear the section 60 and spring back into a position whereby the flat surface 72 of the teeth 68 abuts against the flat surface 64 of the arms 58 as illustrated in FIG. 4, thus keeping the pile 46 in a compressed condition.

As illustrated in FIG. 6, a section of the teeth 68 which extends permenantly inside the channel 68 has a substantially square cross section corresponding to the cross section of the channel 66 thus preventing unwanted rotation of the teeth about their longitudinal axis.

If for some reason, the flattened tires must be relieved from their compressed condition, the top plate 26 can be removed by rotating the plate 45 degrees in any direction. The teeth 68 will disengage from the gripping arms 58 thus allowing the plate 26 to be removed and the half tires 12 to relax into an uncompressed condition.

As mentioned previously, the stacking of used tires into piles of flattened half tires reduces the space required to stack the same amount of tires by approximately 90 percent which represents a major advantage.

The structure proposed in the present invention for stacking the flattened tires not only allows to save valuable space but also allows the piles to be utilise for useful purposes. The piles can indeed by used in a multitude of situations as structural material. One example of such situation involves the use of the piles as building blocks for marine docks.

Although illustrated as being made of polymeric material, the top plate 26, the bottom plate 28 and the central post 24 could be manufactured in concrete or in any other structurally suitable material. When the piles are used as building blocks, the central post 24 is formed of concrete and is reinforced by longitudinal metal rods. Once the half tires are stacked and the top retaining plate 26 is locked in place, the annular space indicated by numeral 76 in FIGS. 4 and 5 between the central post 24 and the rim 18 of the half tires 12 is filled with concrete. Typically, a column can stack one hundred to one hundred and fifty flattened tires and weigh approximately one ton. Columns are also typically 8 feet high and the top and bottom plates have sides which measure approximately 3 feet.

Figure 10:
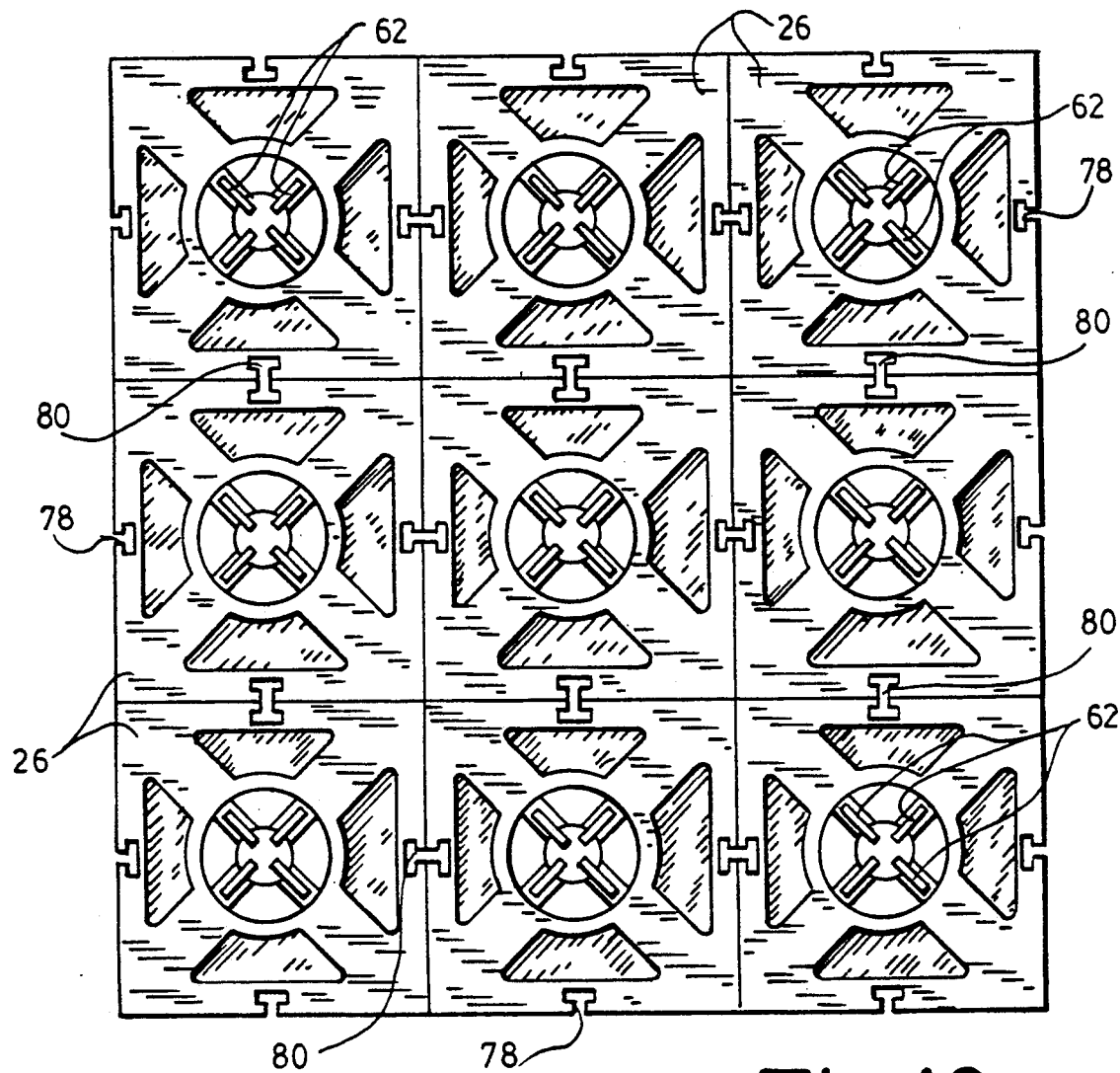
FIG. 10 is a top view of an array of piles locked together.
Figure 15:
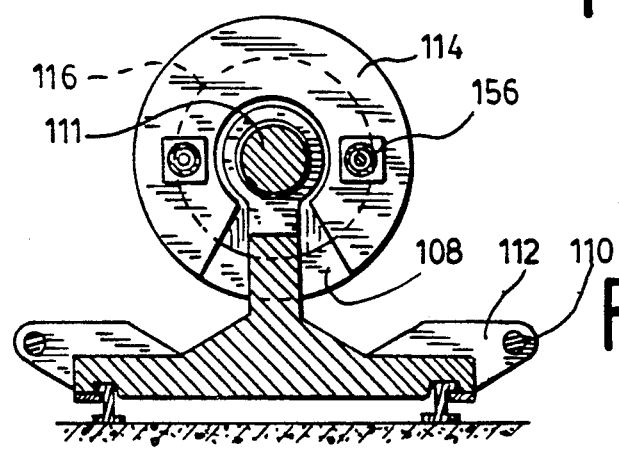
FIG. 15 is a cross-sectional view taken along arrows 15 of FIG. 11.

Provision has been taken to allow numerous building blocks to be assembled together in order to form an array as illustrated in FIG. 10.

Figure 9:
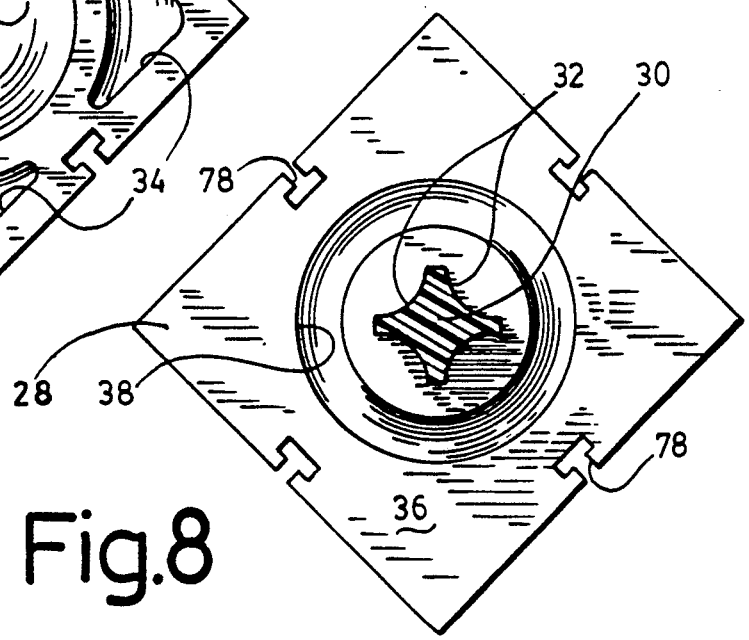
FIG. 9 is a schematic perspective view of an interlocking element adapted to releasably lock together adjacent piles.

Both the top plate 26 and the bottom plate 28 are provided with a set of substantially T-shaped channels 78 extending from their top surface to their bottom surface at their periphery on each four sides. Each T-shaped channel 78 is adapted to receive one half of a linking means 80 having a substantially I-shaped cross section as illustrated in FIG. 9.

The linking means 80 which are press fitted or hammered in the T-shaped channels of two juxtaposed blocks are thus adapted to solidaly link two juxtaposed top plates 26 or bottom plates 28.

Since the length of the linking beam 80 is approximately twice the thickness of the top plates 26 and the bottom plates 28, the linking beam 80 can also be used to vertically link the top plate 26 of a given pile with the bottom plate 28 of a pile located directly over it. All the piles can thus be arranged in structurally stable three-dimensional arrays of various sizes which can be quickly assembled and disassembled.

A multitude of methods and apparatus can be used to slice a tire in two halves along its threaded periphery and produce radial incisions extending through the threaded portion of each half tires in order to provide two half tires which can be flattened and stacked without warping.

The following description refers to two specific methods and apparatus. The first apparatus illustrated in FIGS. 11 through 17 is adapted to operate automatically and produce piles which are automatically stacked on stacking structures corresponding to the previous description. The second apparatus is semi-automatic and requires manual loading and unloading of the tires.

FIGS. 11 and 12 illustrate an automatic apparatus embodying the invention having a cutting unit 82, a compressing unit 84, and a transportation unit 86 adapted to move the uncompressed stacks of half tires 12 from the cutting unit 82 to the compressing unit 84.

The uncut used tires 10 are first positioned side by side on a loading platform 88. The tires 10 are then fed into the cutting unit 82 by pushing means (not shown) which sequentially pushes one tire at a time onto an inclined loading chute 90.

The tires 10 roll down the inclined loading chute 90 on to a supporting and centering structure composed of a substantially horizontal supporting arm 94 rigidly linked to a substantially vertical supporting arm 96.

While rolling down the inclined loading chute 90, the tires pass in front of a set of photoelectric cells 92. The photoelectric cells 92 are adapted to detect the diameter of each individual tire 10. An appropriate signal is sent to a pneumatic control box (not shown) by the photoelectric cells 92. The pneumatic control box is adapted to interpret the readings of the photoelectric cells 92 and send an appropriate command to an horizontal size adjustment piston 98 and vertical size adjustment piston 100.

The arms 94 and 96 are attached to the vertical size adjustment piston 100. The vertical size adjustment piston 100 is mounted on the arm of the horizontal size adjustment piston 98 which is mounted on a set of wheels 102. The horizontal size adjustment piston 98 and the vertical size adjustment piston 100 are thus able to displace the tire supported by the arms 94 and 96.

The pistons 98 and 100 are used to align and center tires of various diameters so that the rotational axis of the tires always coincides with the center line referred to in FIG. 13 by numeral 104 of the cutting apparatus 82. The adjustment pistons 98 and 100 are located between a driving disc plate 106 and a compacting disc plate 108.

Once the tire 10 is properly centered in the cutting apparatus 82, the compacting disc plate 108 is moved towards the driving plate 106 thus squeezing the tire 10 and partially flattening it as illustrated in FIG. 13a. The tire 10 being now frictionally supported by the driving plate 106 and the compacting plate 108, the horizontal size adjustment piston 98 pulls out the supporting arms 94 and 96 from underneath the tire 10.

As can be seen in FIG. 13a, the translation of the compacting plate 108 towards the driving plate 106 results from the action of a pair of pistons 110 which push on a substantially L-shaped carriage 112 to which a shaft 111 is rigidly attached. The carriage 112 is slidably mounted on a set of rails 113. The shaft 111 which extends freely through a set of channels provided in both fixed facing plate 114, and a second facing plate 116 is rigidly attached at its other end to the compressing disk 108.

Once the tire 10 is squeezed between the plates 106 and 108, the driving plate 106 is put into rotation by actuating a clutch means 122 linked to a rotational motor 124. The motor 124 is linked to the plate 106 by a shaft 123 which extends through a sleeve 125.

The shaft 123 is linked by a chain 126 to a slidable gear 128 slidably mounted on a splined section 130 of a synchronization shaft 132. The shaft 132 is rotatably suspended to a set of sleeves 134. The sleeves 134 are rigidly attached to a structural element 136 part of the ceiling. The motor 124 and the sleeve 134 are mounted on a base plate 138 adapted to translate horizontally on a set of rails 137.

An abutting arm 140 is mounted at one of its ends on the sleeve 125. The arm 140 has a forked section at its other end adapted to abut against the sides of a slidable gear 128 to transmit the translational movement of the plate 138 to the gear 128. The gear 128 is provided with a keyway corresponding to the teeth of the splined section 130 of the shaft 132. The gear 128 is thus adapted to rotate the synchronization shaft 132 while translating on the splined section 130.

A gear 142 is mounted on the shaft 132 opposite the gear 128. The gear 142 is linked by a chain 144 to a main gear 146 mounted on a splined section 148 of the shaft 111. The splined section 148 of the shaft 111 has teeth which correspond to a keyway in gear 146. The gear 146 is thus adapted to rotate the shaft 111 while allowing its translation.

The synchronization shaft 132 thus allows the rotational synchronization of the driving plate 106 which is attached directly to the motor 124 and of the compressing plate 108. The plate 108 rotates solidarily with the shaft 111 driven by the chain 144 attached to the synchronization shaft 132 which in turn is rotated by the chain 126.

Once the motor 124 is activated and both the driving plate 106 and the compacting plate 108 rotate at a relatively constant speed (usually after one turn), a knife 152 is put into contact with the peripheral threaded portion of the partially compressed tire 10 by a knife piston 154. While the tire 10 is being rotated, the knife 152 continues its forward motion through the threaded portion 14 slicing it in two halves as illustrated in FIG. 16.

Once the tire 10 is split in two halves, the knife 152 is retracted and the clutch 122 is disengaged. A set of radial knife pistons 156, attached at one end to the L-shaped carriage 12 and at the other end to the face plate 114 then initiate a pushing action on the face plate 116 as illustrated in FIG. 13b.

A set of radial knives 158 which are rigidly attached to the face plate 116, and extend through a set of channels 160 provided in the compacting plate 108 are thus laterally pushed into the partially compressed tires 10.

The knives 158 are pushed until they cut through both sides of the partially flattened tire 10. Since the tires 10 are partially compressed, the knife 158 simitaneously cuts through the threaded portion 14 and a portion of both side walls 16 of the tire 10, thus producing the radial incisions referred to by numeral 20 in FIGS. 1 and 2.

Since the knives 158 are adapted to cut through both sides of the partially compressed tires 10, as illustrated in FIG. 13b, a set of corresponding recess 159 are provided in the driving plate 106 to receive the pointed end of the knives 158.

The registering of the pointed ends of the knives 158 in the recess 159 is the main reason for using the synchronisation shaft 132 to synchronize the rotation of the driving disk 106 with the rotation of the compacting disk 108. Once the radial incisions 20 are performed, the pistons 156 pull back the plate 114 and the springs 120 bring the plates 114 and 116 to their original position pulling back the knives 158, as illustrated in FIG. 13c.

Figure 13C:
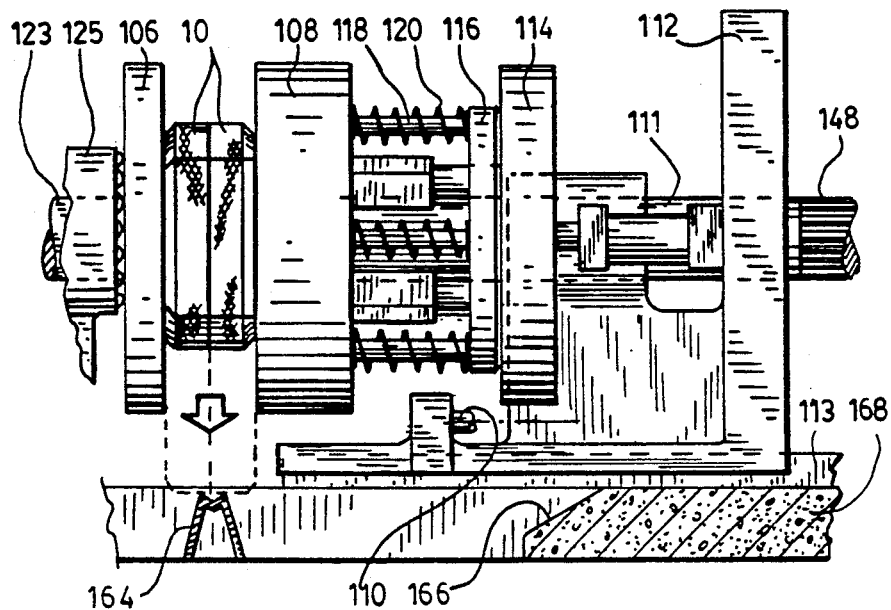
FIG. 13c is a view of the tire being released from the cutting apparatus.
Figure 13D:
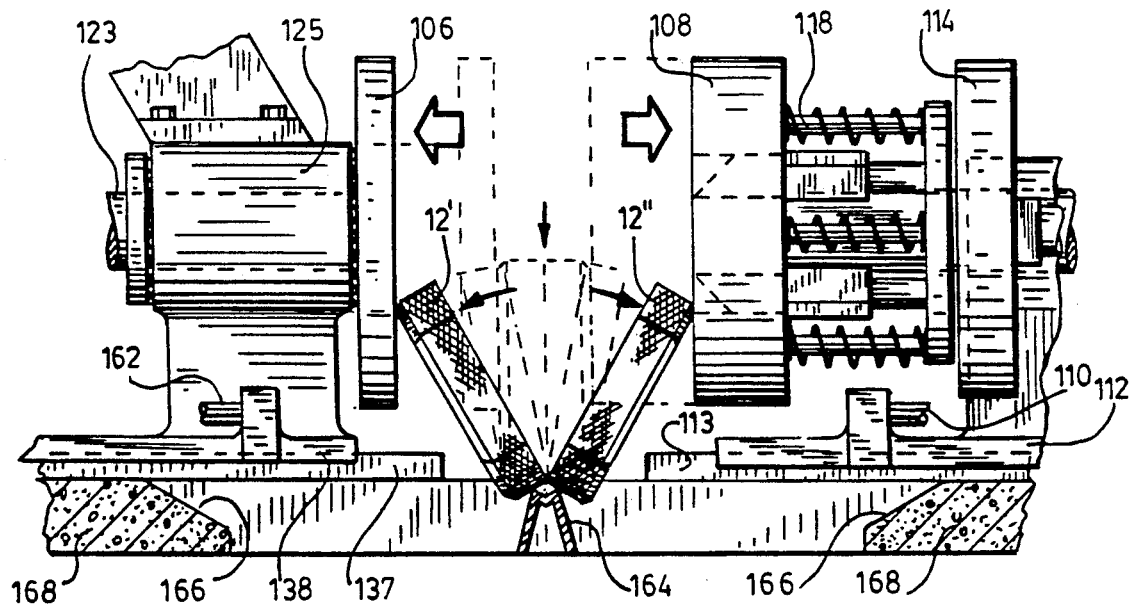

As illustrated in FIGS. 13c and 13d, the L-shaped carriage 112 and the base plate 138 are then similtaneously pulled back respectively by pistons 110 and 162. The tire 10 is thus allowed to relax and falls into a substantially M-shaped element 164.

As illustrated in FIG. 13e, the dividing element 164 divides the split tire into two halves 12' and 12" and directs their fall so that each half tire falls with the threaded portion 14 curving upwardly. The halved tires 12' and 12" fall through an opening 166 in the floor 168.

As illustrated in FIG. 12, a pair of base plates 28 and their associated central posts 24 are strategically positioned underneath in order to receive the falling half tires 12' and 12". The base plates 28 are positioned so that the rim 18 of the half tires 12' and 12" will each encircle a corresponding post 24.

Figure 8:
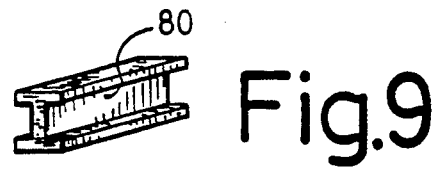
FIG. 8 is a top cross-sectional view taken along arrows 8—8 of FIG. 3.

As mentioned previously, the centering channel 38 illustrated in FIG. 8 helps to align the first tire coming into contact with the base plate 28 around the post 24. The base plates 28 are mounted on a conveyer belt 44 rolling on a set of conveyer rollers 166.

As mentioned previously, a registering pin 42 provided on the conveyer belt 44 is inserted into corresponding registering hollowed section 40 provided at the bottom of the base plate 28 to insure that the base plate 28 is adequately positioned on the conveyer belt 44.

A pair of articulated cylinders 170 illustrated more specifically in FIGS. 12, 13e, 17 and 17a and adapted to encircle the piles 46 of half tires 12 are mounted on an elevated post 171 which is itself mounted on a carriage 172. Since the piles 46 are typically four times higher than the central post 24 the articulated cylinders 170 are adapted to encircle the piles 46 thus preventing the portion of the piles 46 exceeding the post 24 from tilting when, as illustrated in FIG. 12, the piles are moved from a position underneath the cutting apparatus 82 to a position underneath the compressing unit 84.

Figure 17A:
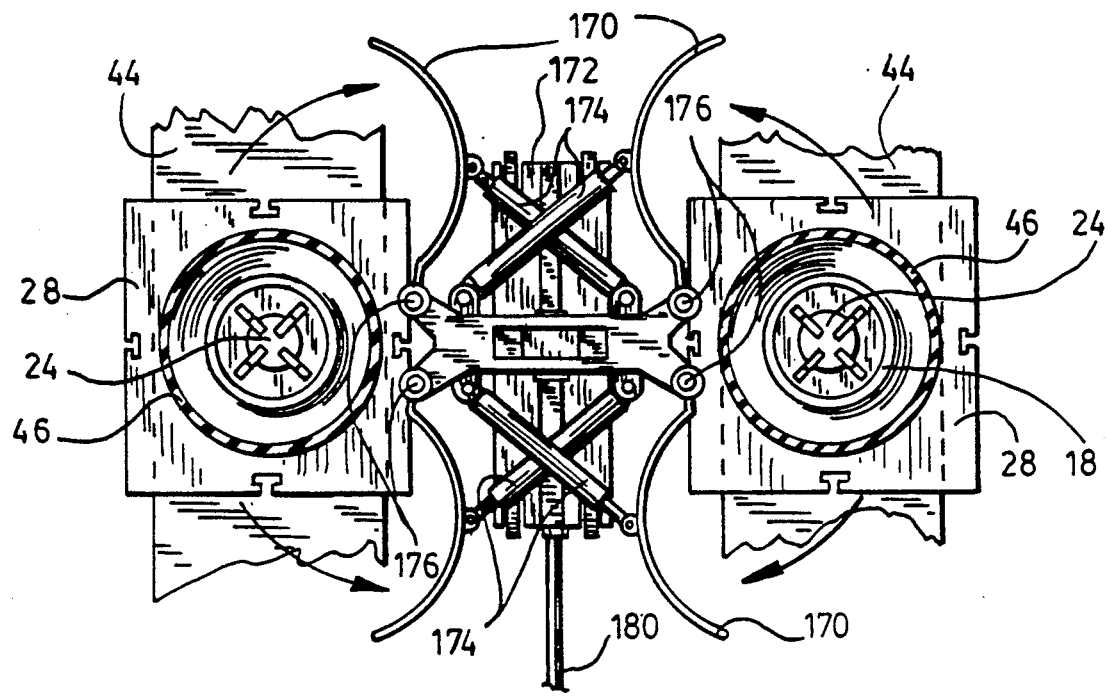
FIG. 17a of the is a top view of the articulated half cylinders in an opened position.
Figure 17:
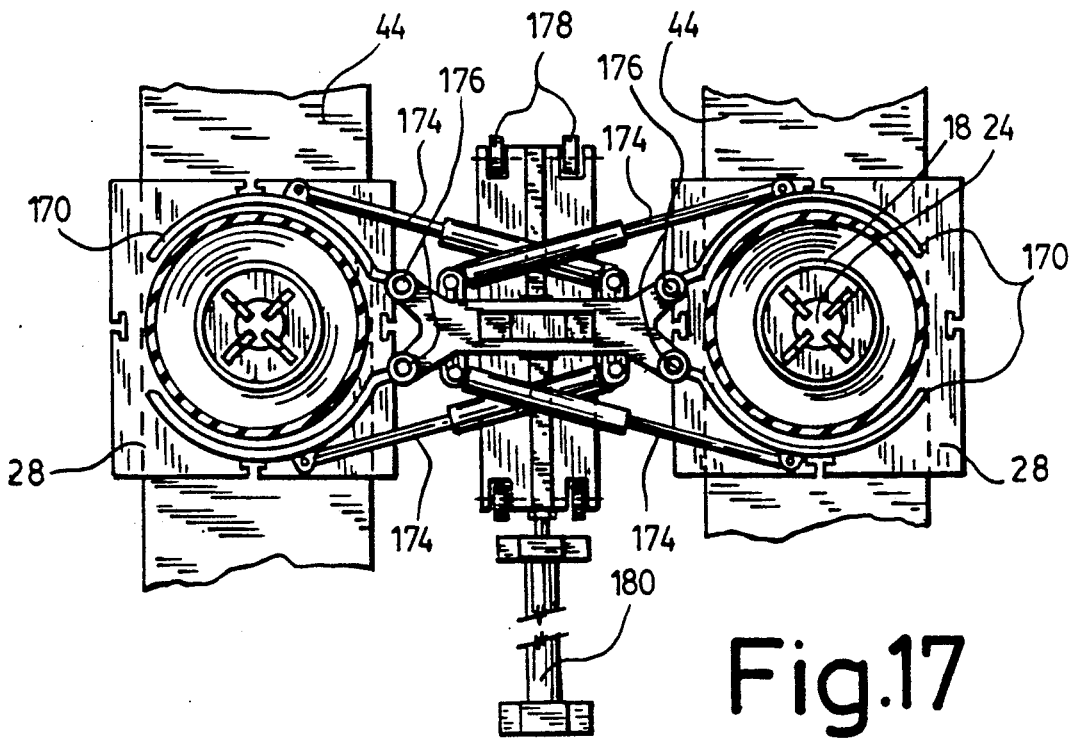
FIG. 17 of the is a top view of the articulated half cylinders adapted to encircle the piles of half tires.
Figure 18:
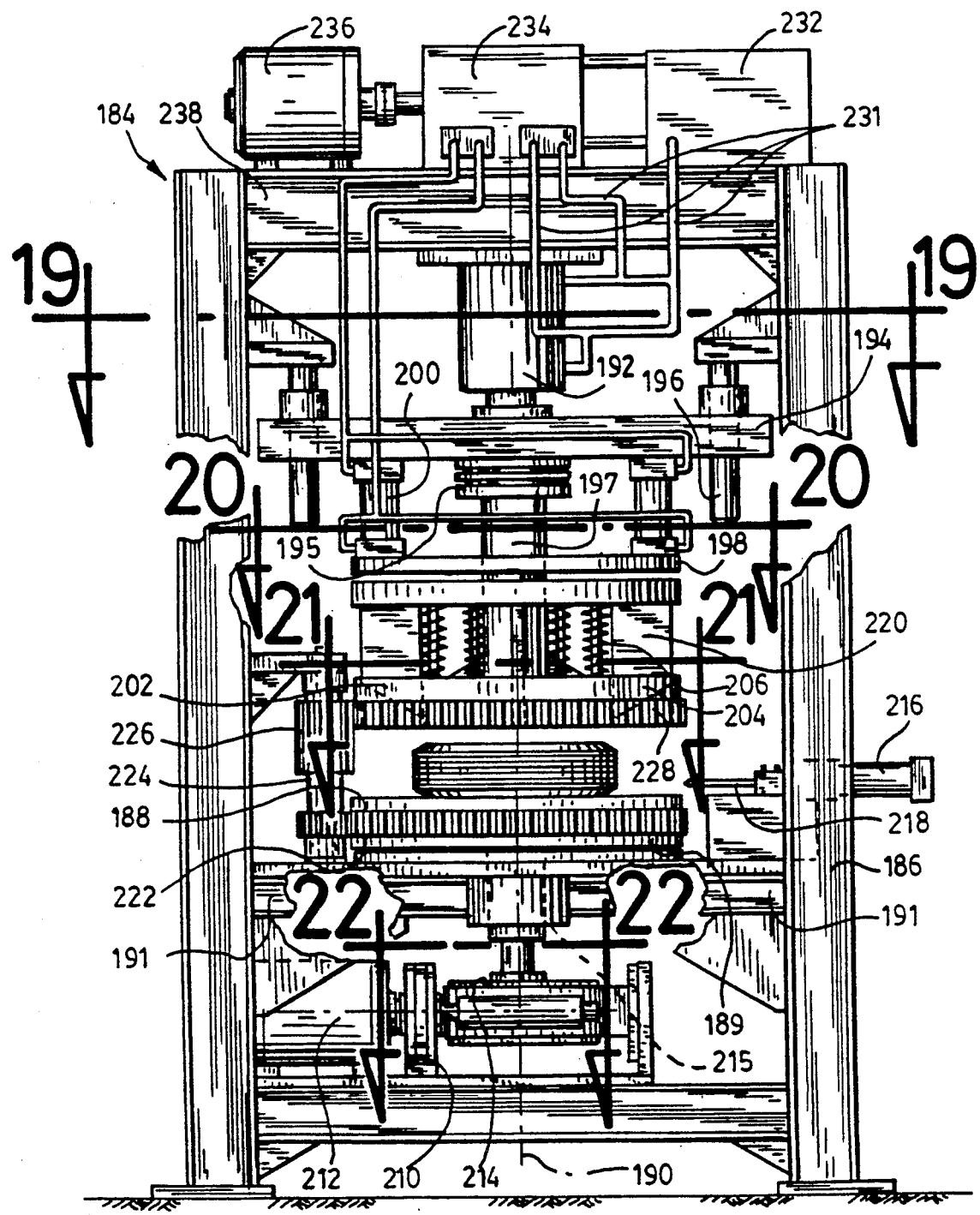
FIG. 18 is an elevational view of a semi-automatic apparatus embodying the invention adapted to slice the tire in half and produce radial incisions.
Figure 19:
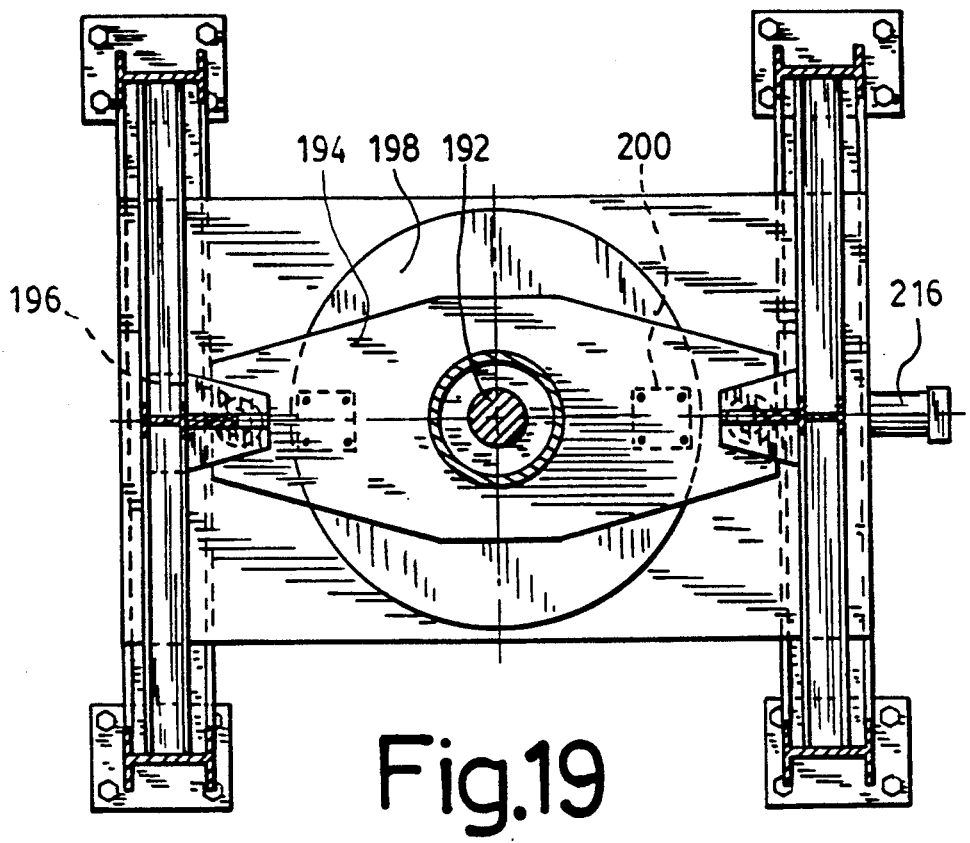
FIG. 19 is a cross-sectional view taken along arrows 19—19 of FIG. 18.
Figure 20:
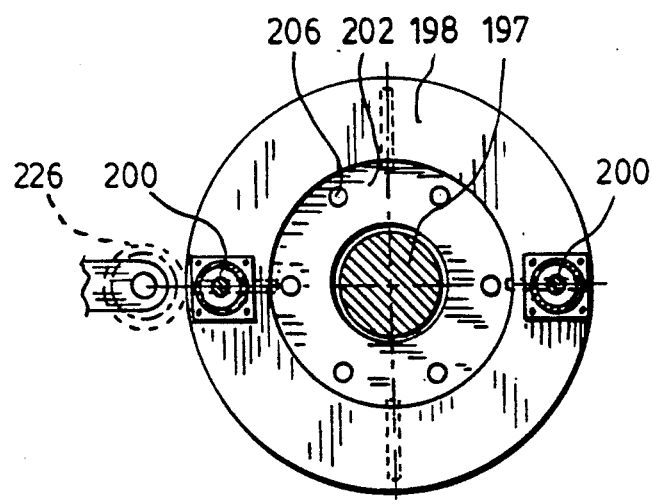
FIG. 20 is a cross-sectional view taken along arrows 20—20 of FIG. 18.
Figure 21:
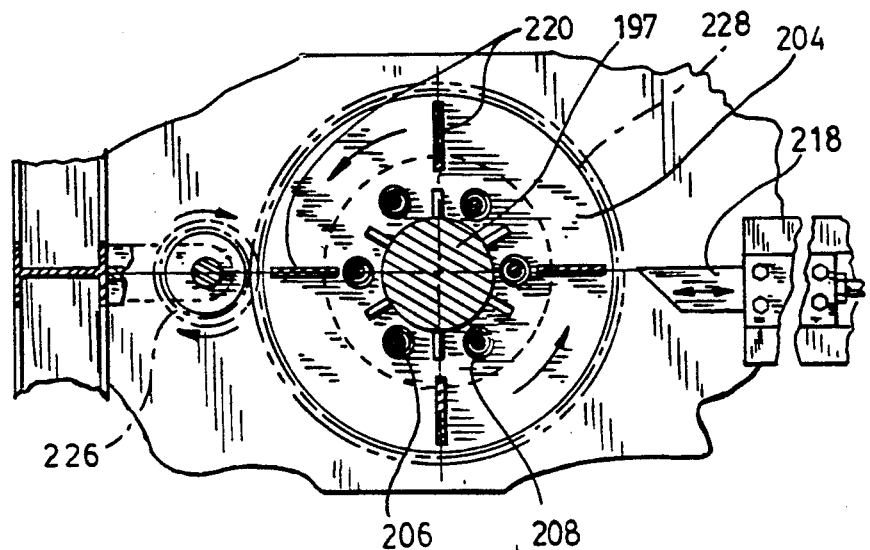
FIG. 21 is a cross-sectional view taken along arrows 21—21 of FIG. 18.
Figure 22:
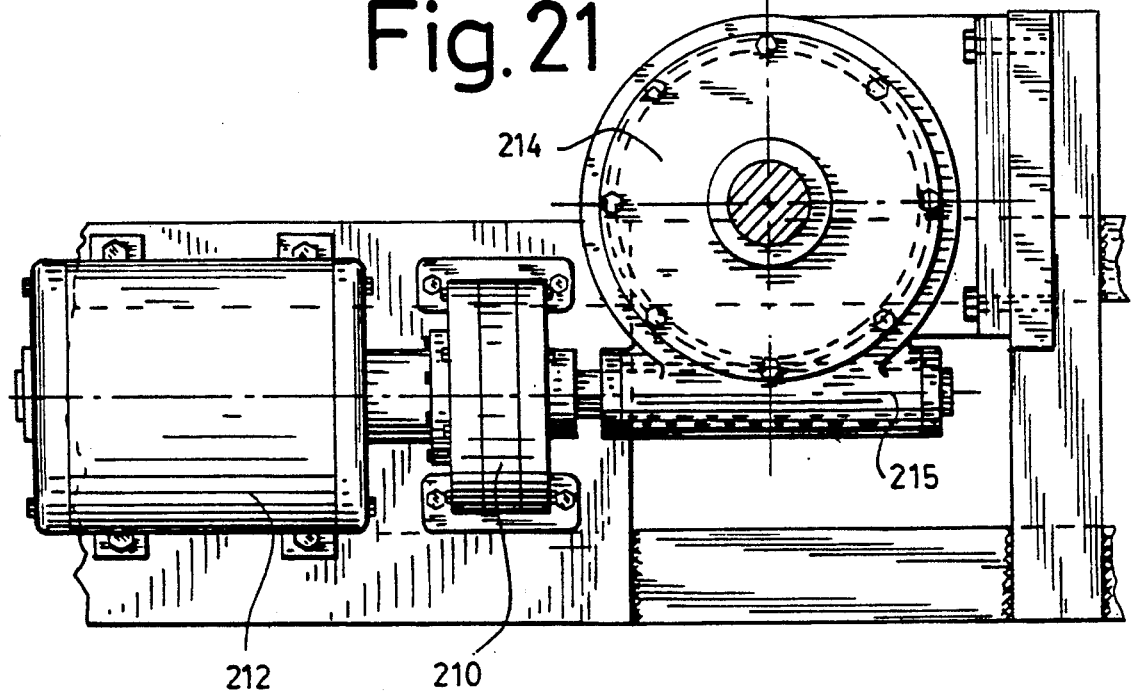
FIG. 22 is a cross-sectional view taken along arrows 22—22 of FIG. 18.

As illustrated in FIGS. 17 and 17a, the articulated cylinders 170 are adapted to open up in two halves. A system of crossed cylinders 174 is adapted to pivot the half cylinders about a set of hinges 176, allowing them to encircle the piles 46. The carriage 172 on which the half cylinders 170 are mounted is positioned between the two conveyer belts 44. The carriage 172 is mounted on a set of wheels 178 allowing the carriage to be pushed and pulled by a piston 180. The movement of the half cylinders 170 is thus independent from the movement of the conveyer belts 44.

In use, the half cylinders 170 encircle the piles 46 until they are positioned underneath the compressing unit 84. The half cylinders 170 then open up as illustrated in FIG. 17a and the piston 180 pulls the carriage 172 away from the pile 46 back underneath the cutting unit 82. The half cylinders then close around a new, already forming, pile of half tires 12 stacking up on a pair of base plates 28 which were brought underneath the cutting unit 84 by the conveyer 44. Once the new piles 46 reach the desired height, the half cylinders 170 accompany the piles 46 underneath the compressing unit 84 and the cycle starts again.

Once the piles 46 are underneath the compressing unit 84, a piston 182, part of the hydraulic mechanical press 48, pushes the top plate downwardly on top of the pile 46. When the plate 46 reaches the top of the post 24, it self-locks into the post 24 according to the method described previously in this patent. The press 48 then releases the top plate 24 and the cycle starts again.

The above described apparatus is thus adapted to take the used tires 10 positioned side by side on its loading platform 88 and transform them into piles of half tires 12 compressed between a top plate 26 and a bottom plate 28 without any manual intervention.

As mentionned previously, a second semi-automatic apparatus using a method somewhat similar to the method employed by the above described automatic apparatus is also adapted to slice tires in half and produce radial incisions extending through the threaded portion of each half tire.

This semi-automatic apparatus, however, does not perform any stacking or compacting operation and requires manual loading of the tires and unloading of the half tires. The semi-automatic apparatus embodying the invention is referred to generally by numeral 184 and is illustrated in FIGS. 18 through 22.

The apparatus 184 is mounted vertically on a frame having four upstanding structural H beans 186. In use, the tire 10 is manually positioned by an operator so that one of its sidewalls 16 rests on driving disc 188. The tire 10 is positioned with its axis of rotation coinciding with the central axis 190 of the apparatus 184. A handle or a pedal (not shown) is then used by the operator to activate the cutting process.

Upon actuation of the lever or pedal, an hydraulic fluid is sent to a main piston 192 which is pushes down on a The plate 194 pushes on a bearing 195 which is connected to shaft 197. The shaft 197 which extends freely through a set of channels provided in both a ring 198 and a pressure plate 202, is rigidly connected to the compressing plate 204. The main piston 192 thus presses the compressing plate 204 against the tire 10 which is partially flattened against the driving disc 188.

Once the tire 10 is in a partially compressed condition, an electromagnetic clutch 210 linked to a rotational motor 212 engages an endless screw 214 which engages a gear 213 connected to a shaft 215 which rotates the driving disk 188. The driving disc 188 is mounted on a bearing 189 which rests on an horizontal support 191.

Once the driving disc 188 rotates at a relatively constant speed, a knife piston 216 pushes on a knife 218 until it comes into contact with the central threaded port i on 214 of the partially flattened tire 10. Once the tire 10 is cut into two halves, the knife 218 is retracted from the tire 10 and the clutch 210 disengages the motor 212. A set of secondary pistons 200 which are attached at one end to the plate 194 and at their other end to the ring 198 push the ring 198 against a prassure plate 202 to which a set of radial knives are attached. The set of radial knives 220 are thus pushed through a corresponding set of channels provided in the compressing plate 204 and through the sides of the partially flattened tire 10.

To create radial incisions such as the one referred to by numeral 10 in FIGS. 1 and 2, the radial knives 220 must cut through both sides of the partially flattened tire 10. In order to accomadate the pointed tip of the radial knives 220, when the knives 220 cut through both sides of the partially flattened tire 10, a set of corresponding recess have been provided in the driving disc 188.

Since the driving disc 188 is rotated by the motor 212, the compressing plate 204 through which the radial knives 220 extend and the pressure plate 202 to which they are attached must rotate in syncrhonisation with the driving disc 188.

The driving disc 188 is thus provided with a set of teeth 221 adapted to engage in a gear 222 linked by a shaft 224 to another gear 226. The gear 226 has a set of axially long teeth which allow the set of teeth 228 provided at the periphery of the compressing plate 204 to translate vertically while maintaining contact. The compressing plate 204 is thus kept in rotational synchronization with the driving disc 188. The bearing 195 allows rotational of the shaft 197 to which the compressing plate 204 is attached.

Once the radial incisions are performed, the ring 198 is pulled back by the secondary pistons 200 and the radial plate 202 to which are attached the radial knives 220 is pulled away from the compressing plate 204 by a set of springs 208 abutting at one of their ends against the plate 202 and at their other end against the compressing plate 204. The springs 208 extend around a set of rods 206. The rods 206 are attached at one end to the pressure plate 202 and are adapted to slide at their other end through a set of corresponding apertures provided in the compressing plate 204. The springs 208 thus allow the radial knives 220 to retract from the sides of the tire 10.

Once the radial knives are retracted from the tire, the main piston 192 lifs the plate 194 to which the compressing plate 204 is attached thus allowing the two half tires to relax into an uncompressed condition. The radial incised half tires are then manually removed and another tire can be positioned on the driving plate 188 to start another cutting cycle.

Hydraulic pressure is provided to both the main piston 192 and the secondary pistons 200 by an hydraulic circuitry 231. The pressure is built inside a reservoir 232 by an hydraulic pump 234 linked to a motor 236. The motor 236, the pump 234 and the reservoir 232 are mounted on an horizontal platform 238 attached to the top portion of the apparatus 184.

I claim:

1. A method for storing a plurality of tires having a threaded portion, a rim portion and two sidewall portions, said method comprising the following steps;
   peripherally slicing each of said tires in two half tires along said threaded portion about midway between said sidewall portions,
   performing radial incisions in each of said two half tires, said incisions extending through said threaded portion and part of said sidewall portion,
   stacking up said half tires one on top of the other in order to form a pile of half tires,
   compressing said pile longitudinally in order to flatten said half tires one over the other,
   whereby, said radial incisions allow the threaded portion of each half tire to lie in the same plane as the sidewalls of the same half tire without warping when said half tire is compressed into a flattened condition.

2. A method for storing a plurality of tires as recited in claim 1, wherein the sidewalls of the half tires are stacked with their sidewalls facing in the same direction.

3. A method for storing a plurality of tires as recited in claim 1, in which said incisions extend up to about the middle of said sidewalls.

4. A method for storing a plurality of tires as recited in claim 1, wherein said half tires are coaxially stacked up.

5. A device comprising a plurality of half tires resulting from peripherally and radially cut tires, said device comprising a central shaft for coaxially stacking up said half tires, a base secured to said shaft for supporting said half tires, a perforated plate adapted to axially slide downwardly on said shaft over a plurality of said half tires and adapted to be mounted on said shaft for compressing said half tires and means for locking said perforated plate to said shaft.

6. A device as recited in claim 5, wherein said perforated plate comprises releasably self-locking teeth centrally directed toward said shaft, whereby said perforated plate is adapted to compress a pile of half tires of a predetermined height.

7. A device as recited in claim 6, wherein said base comprises an annular groove around said shaft for centering the lowermost of said half tire.

8. A device as recited in claim 5, wherein a cylindrical annular space defined between said central shaft and said rim of said half tires stacked up on said shaft is filled with filling material and wherein said central shaft is reinforced with longitudinal metal rods whereby said device is adapted to be used as a structural component.

9. An apparatus adapted to perform a cutting cycle for slicing a tire having a threaded portion, two side wall portions and a rim portion in two half tires along said threaded portion and performing a plurality of radial incisions extending through said threaded portion, said apparatus comprising:
   a base frame,
   a first plate and a second plate positioned on each side of said tire,
   a means for pushing said first plate against said tire, thus partially compressing said tire between said first plate and said second plate and bringing said tire to a partially flattened condition,
   a means for rotating said second plate,
   a means for bringing a peripheral knife in contact with said threaded portion of said tire when said tire is rotated and is in said partially flattened condition,
   a means for pushing a set of radial knives through a set of channels provided in said first plate and through both sides of said tire when said tire is in said flattened condition, in order to perform said radial incisions,
   recess means in said second plate for receiving said radial knives once they have cut through said both sides of said tire,
   means for rotating said first plate in synchronization with the rotation of said second plate so that said recess means are always in register with said radial knives,
   means to retract said radial knives from said tire,
   means to move said first plate away from said second plate to allow said two half tires once they are cut to relax into an uncompressed condition and to allow said half tires to be removed from said apparatus whereby, during a cutting cycle, said first plate first flattens said tire against said second plate, said first plate and said second plate are then put into a synchronized rotation and said peripheral knife is put into contact with said threaded portion of said tire in said flattened condition to slice said tire into said two half tires, said peripheral knife is then retracted and said rotation of said first and second plate is stopped, said radial knives are then pushed through said channels in said first plate and through said tire until said radial knives extend through said both of sides of said tire thus producing said radial incisions, said knives extending into said a set of recess means provided in said second plate, said radial knives are then retracted from said tire and said first plate is moved away from said second plate thus allowing said tire now cut into radially incised half tires to relax into an uncompressed condition and to be removed from said apparatus.

10. An apparatus for slicing tires as recited in claim 9, wherein said means for rotating said second plate comprises a second plate shaft rigidly linked to said second plate at one end and releasably connected to a rotational motor at its other end by a clutch means, whereby said second plate is selectively put into rotation by actuating said clutch means.

11. An apparatus for slicing tires as recited in claim 9, wherein said means for bringing said peripheral knife in contact with said threaded portion of said tire comprises a piston rigidly attached to said frame at one of its end and to said peripheral knife at its other end, said piston being positioned between said first plate and said second plate adjacent the periphery of said tire when said tire is in said partially flattened condition, whereby said piston is adapted to bring said peripheral knife in contact with said threaded portion of said tire in said partially flattened condition when said tire is rotating and said piston is also adapted to retract said peripheral knife from said tire when said tire is sliced in said two half tires.

12. An apparatus for slicing tires as recited in claim 9, wherein said means for pushing said first plate against said tire comprises a translating structural component adapted to translate on said base frame, a first plate shaft rigidly linked to said first plate at one of its ends and rotatably mounted to said translating structural component at its other end, a piston rigidly linked to said base frame at one of its ends and to said translating structural component at its other end, whereby said piston is adapted to push said translating structural component which is linked to said first plate by said first plate shaft thus pushing said first plate against said tire while allowing a rotation of botch said first plate and first plate shaft.

13. An apparatus for slicing tires as recited in claim 9, wherein said radial knives are attached at one of their ends to a first facing plate and wherein said means for pushing said set of radial knives through said set of channels provided in said first plate and through said both sides of said tire comprises at least one secondary piston attached at one of its ends to said translating structural component and at its other end to a second facing plate, whereby said secondary piston is adapted to push said second facing plate against said first facing plate to which said radial knives are attached thus driving said radial knives through said set of channels in said first plate and through said both sides of said tire.

14. An apparatus for slicing tires as recited in claim 12, wherein said first facing plate is linked to said first plate by a set of guiding rods connected at one of their ends to said first facing plate and adapted to slide inside a set of corresponding apertures provided in said first plate, said means for retracting said radial knives from said both sides of said tire comprising a set of springs abutting at one of their ends against said first plate and at their other ends against said first facing plate, said springs being mounted on said guiding rods, whereby when said secondary piston pushes said second facing plate against said first facing plate thus driving said radial knives through said both sides of said tire, said springs are compressed between said first plate and said first facing plate and whereby when said secondary piston retracts said secondary facing plate from said first plate, said springs resiliently separate said first facing plate from said first plate thus retracting said radial knife from said tire.

15. An apparatus for slicing tires as recited in claim 14, wherein said means for rotating said second plate in synchronization with said rotation of said first plate so that said recess means are always in register with said radial knives comprises a first set of teeth mounted on the periphery of said second plate, a first gear adapted to engage said first set of teeth, a shaft axially linking said first gear with a second gear, a second set of teeth mounted on the periphery of said first plate and adapted to engage with said second gear, said second gear having axially long teeth, whereby, when said second plate is put into rotation, said first set of teeth rotates said first gear, said shaft transmits the rotation to said second gear which rotates said second set of teeth on the periphery of said first plate and whereby said axially long teeth allows said first plate to translate while maintaining a contact between said second set of teeth and said second gear.

16. An apparatus for slicing tires as recited in claim 14, wherein said first plate shaft has a splined section and wherein said means for rotating said second plate in synchronization with the rotation of said first plate so that said recess means are always in register with said radial knife comprises, a synchronization shaft having a synchronization splined section, said shaft being rotatably suspended through a set of sleeves, said sleeves being attached to a structural element positioned over said apparatus, a slidable gear slidably mounted on said synchronization spline section of said synchronization shaft, a first forked arm fixed at one end to said rotational motor and having a first arm forked section at its other end adapted to abut against both sides of said slidable gear, a first fixed gear mounted on said synchronization shaft, a second fixed gear mounted on said splined section of said first plate shaft, a first chain rotatably linking said slidable gear to said second plate shaft, a second chain rotatably linking said first fixed gear to said second fixed gear, a second forked arm fixed at one of its ends to said base frame and having a second arm forked section abutting against both sides of said second fixed gear, whereby upon actuation of said rotational motor, said second plate shaft rotates said first chain which rotates said slidable gear, said slidable gear rotating said synchronization shaft on which said first fixed gear is mounted, said first fixed gear rotating said second chain which rotates said second fixed gear mounted on said spline section of said first plate shaft, said rotational motor thus being adapted to rotate both said second plate shaft and said first plate shaft in synchronization, and whereby said slidable gear is adapted to translate on said spline section of said synchronization shaft and whereby said splined section of said first plate shaft is adapted to translate on said second fixed gear.

17. An apparatus as recited in claim 9, wherein said tires are fed into said apparatus by rolling down a loading chute onto a supporting structure composed of a substantially horizontal supporting arm rigidly linked to a substantially vertical, supporting arm, said tires passing in front of a set of photoelectric cells while rolling down said inclined loading chute, said photoelectric cells being adapted to detect the diameter of each individual tire, said photoelectric cells sending a signal to a pneumatic control box, said pneumatic control box being adapted to interpret the reading of said photoelectric cells and send a command to an horizontal size adjustment piston and a vertical size adjustment piston, said horizontal and vertical size adjustment pistons being adapted to move said horizontal supporting arm and said vertical supporting arm in order to center the tire in line with a central longitudinal axis of said first plate shaft.

18. An apparatus as recited in claim 9, wherein when said first plate is moved away from said second plate press allowing the tire to relax to an uncompressed condition, said tire falls onto a substantially M-shaped splitting element, said splitting element being adapted to split said tire into two halfs and to direct the fall of said half tires so that each half tire falls with said threaded portion curving upwardly.

19. An apparatus as recited in claim 16, wherein said base frame is positioned on a floor, said floor having an aperture positioned adjacent said first plate and said second plate whereby said half tires fall through said aperture onto a corresponding pair of said base plates and their associated central post strategically positioned underneath said opening in order to receive said falling half tires and form stacked piles.

20. An apparatus as recited in claim 17, wherein each one of said base plate is mounted on a corresponding conveyer belt adapted to bring each of said piles of stacked half tires to a compressing unit.

21. An apparatus as recited in claim 20, having a pair of articulated cylinders adapted to encircle said piles of stacked half tires to prevent a portion of said piles extending from said posts from tilting when said piles are moved from a position underneath said first and second plates to a position underneath a compressing unit, said pair of articulated cylinders being adapted to open up in two halves about a set of hinges, allowing said articulated cylinders to encircle said piles, said articulated cylinders being mounted on a carriage, said carriage being linked to a carriage piston adapted to push and pull said carriage, the movement of said half cylinders thus being independent from the movement of said conveyer belts whereby said half cylinders encircle said piles until they are positioned underneath said compressing unit, said half cylinders then opening up and said piston then pulling said carriage away from said piles back underneath said first and second plate, said half cylinder then moving around a new, already forming pile of half tires stacking up on a pair of said base plates which were brought underneath said first and second plate by said conveyer belt.

* * * * *